United States Patent
Kirchdoerffer et al.

(10) Patent No.: US 7,249,522 B2
(45) Date of Patent: Jul. 31, 2007

(54) OPTICAL MEASURING DEVICE

(75) Inventors: Rémy Kirchdoerffer, Reichshoffen (FR); Gerd Ebelt, Freinsheim (DE); Wolfgang Preuss, Mannheim (DE)

(73) Assignee: SENSTRONIC Deutschland GmbH, Freinsheim (DE)

(*) Notice: Subject to any disclaimer, the term of this patent is extended or adjusted under 35 U.S.C. 154(b) by 72 days.

(21) Appl. No.: 11/115,393

(22) Filed: Apr. 27, 2005

(65) Prior Publication Data

US 2005/0241407 A1 Nov. 3, 2005

(30) Foreign Application Priority Data

Apr. 28, 2004 (DE) .................. 20 2004 006 799 U

(51) Int. Cl.
*G01N 3/08* (2006.01)
(52) U.S. Cl. .................... 73/818; 73/862.043
(58) Field of Classification Search ............... 73/818, 73/862.043, DIG. 4
See application file for complete search history.

(56) References Cited

U.S. PATENT DOCUMENTS

| 4,485,683 | A | 12/1984 | Hass |
| 4,704,909 | A | 11/1987 | Grahn et al. |
| 5,204,538 | A | 4/1993 | Genovese |
| 5,209,126 | A | 5/1993 | Grahn |
| 5,553,500 | A * | 9/1996 | Grahn et al. .................. 73/628 |
| 6,005,199 | A | 12/1999 | Harada et al. |
| RE37,065 | E * | 2/2001 | Grahn .......................... 73/628 |

FOREIGN PATENT DOCUMENTS

| EP | 0 682 226 | 11/1995 |
| EP | 0 571 118 | 8/1998 |
| GB | 2 134 267 | 8/1984 |
| GB | 2 146 774 | 4/1985 |

* cited by examiner

*Primary Examiner*—Edward Lefkowitz
*Assistant Examiner*—Freddie Kirkland, III
(74) *Attorney, Agent, or Firm*—Dykema Gossett PLLC

(57) ABSTRACT

The invention relates to a measuring device, comprising a housing having two opposing measuring surfaces, to each of which there are assigned a phototransmitter and photoreceiver disposed in the interior of said housing, each measuring surface having an opening which is transparent to light of at least one wavelength and at least one of the two measuring surfaces is in the form of a dynamometer.

21 Claims, 2 Drawing Sheets

OPTICAL MEASURING DEVICE

RELATED APPLICATIONS

This application claims benefit of priority of German Patent Application No. 20 2004 006 799.4, filed Apr. 28, 2004.

BACKGROUND OF THE INVENTION

The invention relates to a measuring device comprising a housing having two opposing measuring surfaces, to each of which there are assigned a phototransmitter and a photoreceiver disposed in the interior of the housing and each measuring surface has an opening which is transparent to light of at least one wavelength.

A measuring device of this type is suitable for testing industrial cutting tools by ascertaining the state of the tool from the condition of its surface, if changes to the bit have taken place during use.

A measuring device having two opposing measuring surfaces is particularly suitable for testing those tools which act on a workpiece held between two opposing parts of the tool. These can be, for example, embossing or punching tools.

Beside the surface condition, the force with which the two parts of the tool press against one another can be another important variable in the machining process involving tools of this type. This pressing force can change in the course of time. Thus in addition to using an optical measuring device, measurement by means of a dynamometer is carried out.

To this end, dynamometers are known which make use of the principle of deformation of a Wheatstone Bridge and are utilized for determining the clamping force of plierguns.

Thus to safeguard quality and to achieve perfect functioning, it is important to perform checks at regular intervals. In order to achieve uninterrupted operation, it is advantageous if the necessary measuring operations can be accomplished with little expenditure or effort and time.

DESCRIPTION OF THE INVENTION

The measuring device according to the invention contains a housing having two opposing measuring surfaces, a phototransmitter and photoreceiver disposed in the interior of the housing being assigned to each measuring surface and each measuring surface including an opening transparent to light of at least one wavelength, in which arrangement at least one of the two measuring surfaces being is designed as a dynamometer. This enables simultaneous optical testing of two cooperating parts of a tool and also testing of the pressing force of the tool. Calibration can also be performed.

The measuring device can advantageously be designed in such a way that the measuring surface designed as a dynamometer contains a diaphragm which is deformable under the action of force, since this has a readily controllable force/stretch relationship.

The measuring device can preferably be designed in such a way that the measuring surface is equipped with at least a half bridge or a full bridge of an electric circuit, whose resistance changes with the deformation of the diaphragm under the action of force.

The measuring device can advantageously be designed such that the measuring surface designed as a dynamometer contains a force transducer whose electrical properties change under the action of force, preferably a piezoelectric force transducer.

Advantageously, the measuring device is designed such that a force conductor having a contact surface is present in each measuring surface. This allows for the use of the measuring device on two parts of a tool which are attached to the tool.

It is advantageous if this measuring device is equipped with a contact surface disposed on an exchangeable mount. Thus maintenance of the measuring device made necessary by wear is thereby simplified.

An advantageous refinement of the measuring device consists in that the contact surface surrounds an opening transparent to light of at least one wavelength. This makes it possible to create a concentric arrangement of the optical components.

Advantageously, the measuring device is designed such that the housing comprises at least two parts and that one of the measuring surfaces is disposed at the bottom of one housing part, which delimits an interior space, whilst the other measuring surface is on a cover adapted to close said interior space and that an electrical connection to an electric circuit situated in the interior of the housing is present. This makes it possible to read out the measured data from outside.

The measuring device is advantageously distinguished in that the measuring surface at the bottom of the housing part is designed as a dynamometer. This has the advantage that a very compact arrangement of the different measuring methods is possible.

Advantageously, the electric circuit works together with the phototransmitter and photoreceiver in the measuring apparatus, such that quasi-simultaneous measurements are made possible.

It is particularly advantageous when the phototransmitter and photoreceiver associated with one of the measuring surfaces are accommodated, together with the phototransmitter and photoreceiver associated with the other measuring surface, in a common insert. This leads to an easy-to-maintain design of the measuring device.

Advantageously, the phototransmitter and photoreceiver associated with one measuring surface are arranged opposite each other in a crisscross arrangement relative to the phototransmitter and photoreceiver associated with the other measuring surface in the insert, since in this way both tool parts can be measured concentrically.

An advantageous embodiment of the measuring device has the characteristic that the optical axis of the phototransmitter and the optical axis of the photoreceiver are at an angle to each another and are oriented toward the opening. This construction facilitates the arrangement of the optical elements in the confined space.

Advantageously, the measuring device is designed such that the insert in the housing is resiliently mounted relative to the measuring surface designed as a dynamometer. This construction has the advantage that the measuring devices are protected from the forces applied by the tool parts.

Advantageously, the measuring device is designed such that control means having a learning mode for optical measurement and a learning mode for force measurement are provided. In this way, the measuring device can be adapted in a simple manner to the individual requirements of applications in this field. It is possible to allow for tolerances, for example by setting upper and lower limits to the tool pressure. In addition, calibration of the measuring device can thus be repeated regularly in a simple manner.

Advantageously, means of selection are provided for the learning mode of the measuring device. Calibrations can thus be performed separately from one another.

Advantageously, a signal device for indicating the operational status is provided on the measuring device in order to provide information on the operating state of the measuring device.

It has been found to be advantageous if the measuring device signals each particular operating state. This makes the device easier to use.

Advantageously, two or three full bridges are provided on the diaphragm in the measuring device, such that multiaxial analysis of the direction of force flow is possible. Not only axial forces but also transverse forces can thus be determined.

EXEMPLARY EMBODIMENT OF THE INVENTION

Figure 1:
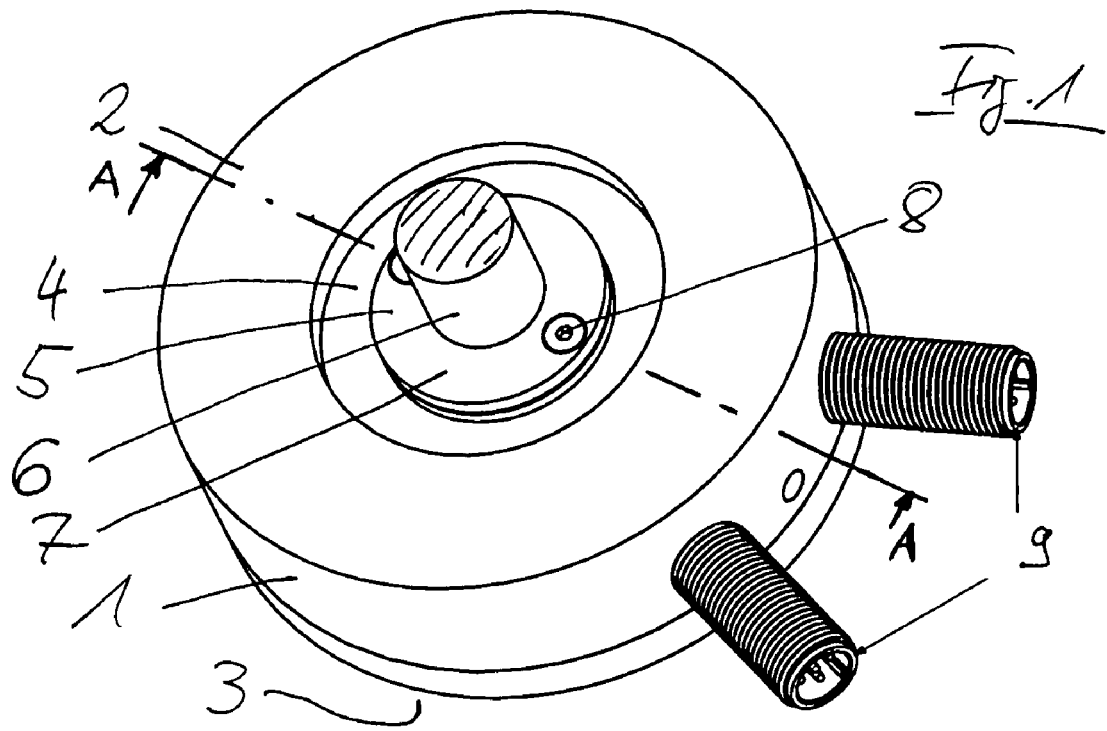
FIG. 1 is a perspective view of the measuring device, seen from above.

A measuring device according to the invention is shown in FIG. 1. The measuring device comprises a housing 1 having two opposing measuring surfaces 2, 3, which are designed here as part of a cylinder. It is obvious that other forms of housings can be used.

The measuring surface 2 has a diaphragm 4 which is deformable under the action of force and is thus designed here as a dynamometer. Moreover, the measuring surface 2 is provided with a force conductor 5, which is contacted by a bit 6 to be measured. Force conductor 5 is additionally provided with an exchangeable mount 7 to obviate the necessity of exchanging the complete measuring device in the case of wear. Fixing is carried out via fasteners 8, here in the form of screws. In addition, housing 1 is provided with terminals 9 for connection to an electrical circuit located in the interior of the housing.

Figure 2:
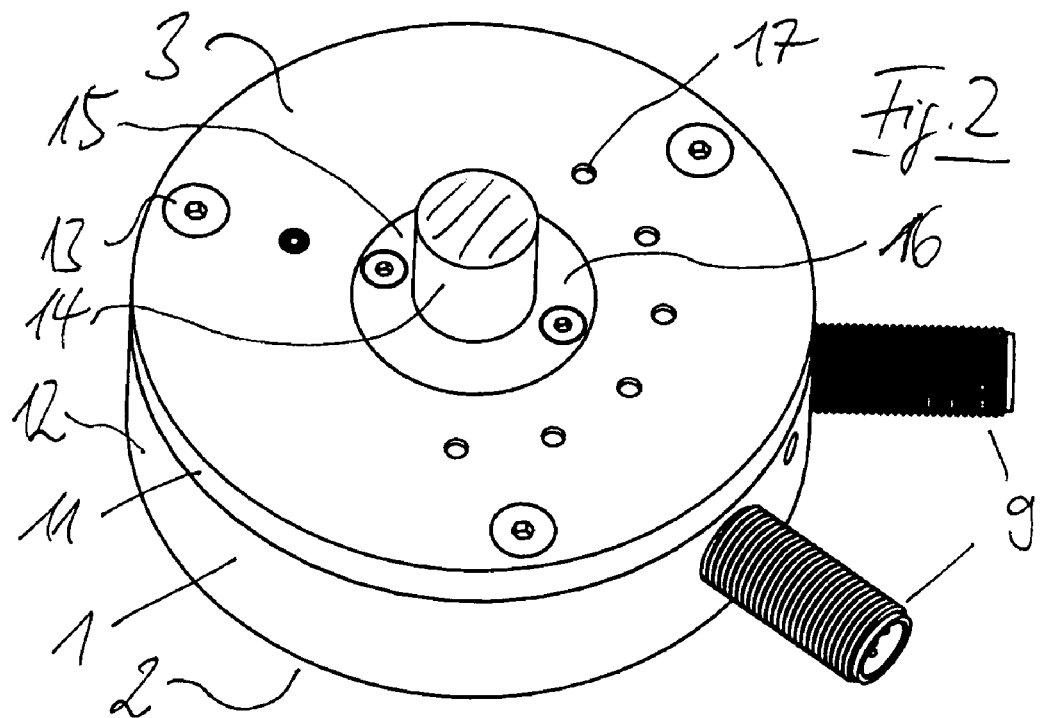
FIG. 2 is a perspective view of the other side.

FIG. 2 is a view of the measuring device of FIG. 1 showing measuring face 3. It can be seen that measuring surface 3 is located on a cover 11, which can be fixed to a housing part 12, for example by means of fasteners 13, in this case screws. Another bit 14 contacts measuring surface 3, for which purpose a force conductor 15 is used, which in the present case comprises an exchangeable mount 16. Bits 6 and 14 cooperate in such a fashion that they exert a clamping force on the workpiece, for example.

In cover 14, indicators 17 are additionally provided for the purpose of indicating various operational states of the measuring device. Indicators 17 are set at a distance from mount 16. It is to be noted that measuring surface 3 may also be designed to include a diaphragm which is deformable under the action of force, but in most applications it is adequate if only one of the two measuring surfaces is designed as a dynamometer. Even if cover 11 bearing measuring surface 3 experiences a certain degree of deformation under the action of force exerted by bit 14, a sufficiently accurate signal for the assessment of the force exerted can be obtained simply on account of the deformation of measuring surface 2 designed as a dynamometer.

Figure 3:
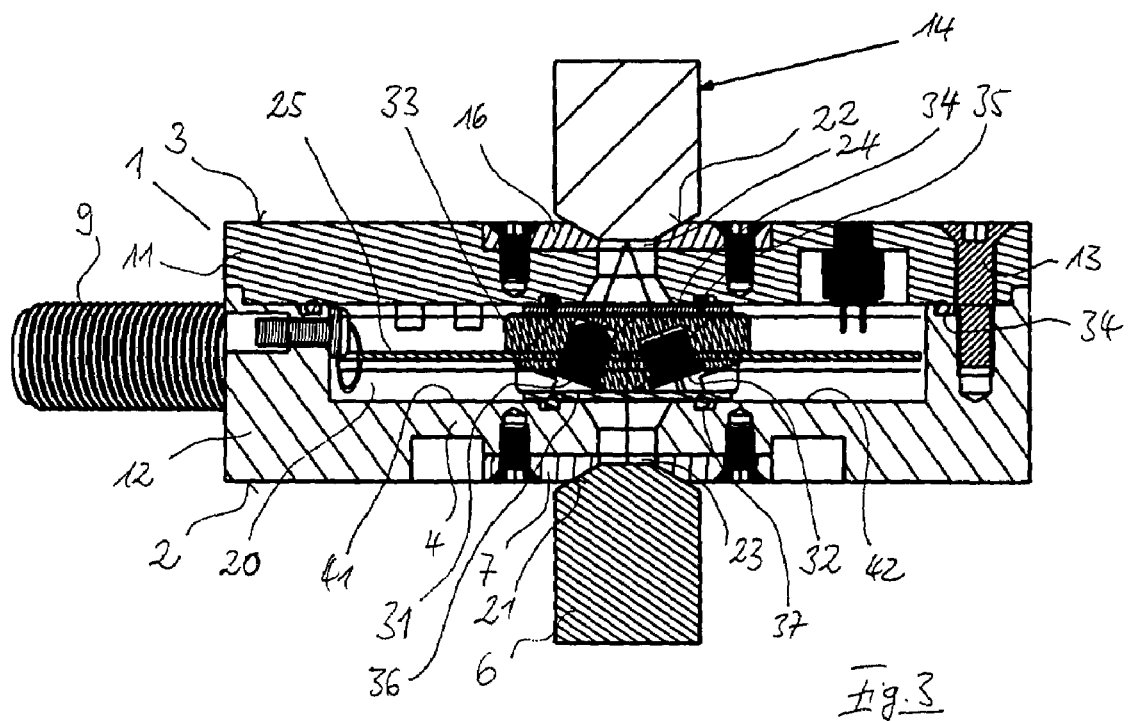
FIG. 3 is a section taken through the measuring device along an axis passing through the center of the device.

A section through the measuring device taken along line A-A of FIG. 1 is shown in FIG. 3. The Figure shows the two-part housing 1 comprising housing part 12 and cover 11, which enclose the interior 20 of the housing. Bits 6 and 14 bear against measuring surfaces 2 and 3, for which purpose mounts 7 and 16 are provided with conical contact faces 21 and 22 respectively. Contact faces 21, 22 correspond in their geometry to the tips of bits 6, 14 except that said contact faces 21, 22 each have an opening 23, 24 which is transparent to light of at least one wavelength.

In the interior 20 of the housing there is located an electrical circuit 25, which is accessible from outside via terminal 9. Furthermore, in said interior space 20 of the housing there are disposed a phototransmitter 31 and a photoreceiver 32, these being mounted in an insert 33 and oriented toward opening 24. A covering disk 34 is provided in the optical path of phototransmitter 31 and photoreceiver 32, which is sealed from cover 11 by means of a seal 35. Covering disk 34 is transparent to the light analyzed by the photoreceiver.

In the insert 33, another phototransmitter/photoreceiver pair is provided which is displaced by 90 degrees from the position shown in FIG. 3, this pair being directed toward opening 23. Here again, a covering disk 36 and a seal 37 are provided in order to seal the interior 20 of the housing from opening 23.

Phototransmitter 31 and photoreceiver 32 are axially at an angle to one another, and as already mentioned, are oriented such that an end face of bits 6, 14 is illuminated and the reflected radiation is detected in the photoreceiver 32.

Alternatively, of course, this optical measurement may be carried out even if the test object has not yet been caused to bear against the measuring surface. In this case it is possible to measure larger areas than the area delimited by opening 24.

On diaphragm 4 in measuring face 2, parts 41, 42 of a full bridge of an electrical circuit are provided in the interior of the housing and are adapted to experience a change in resistance when diaphragm 4 is deformed under the action of force. Full bridges of this type are well known in the field of force measurement. This full bridge is electrically connected to the electrical circuit 25.

Of course, it is also conceivable to provide a force transducer which changes its electrical characteristics under the action of force, for example a piezoelectric force transducer.

Cover 11 is connected to housing part 12 by screw 13 and sealed by a sealing element 34.

Figure 4:
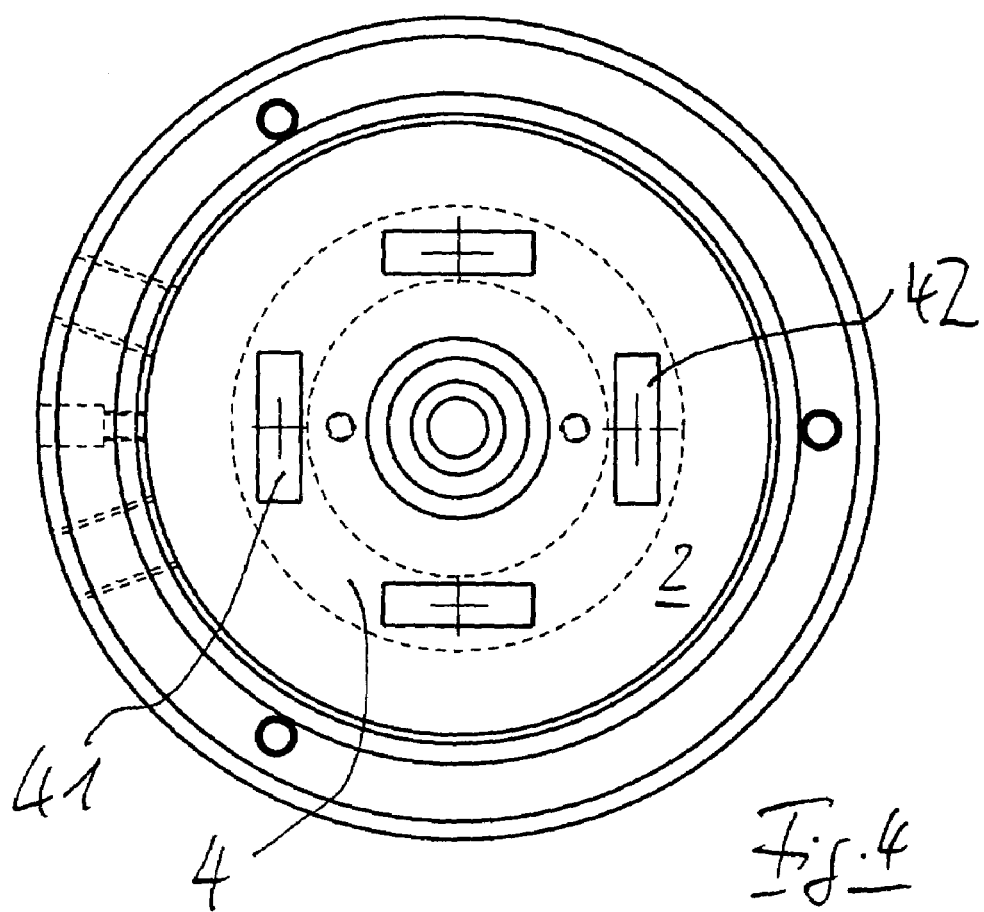
FIG. 4 is a top view of an open measuring device illustrating the arrangement of the photoreceivers and phototransmitters.

A view from inside of measuring surface 2 designed as a dynamometer is shown in FIG. 4. The electrical system 41, 42 of a full bridge can be discerned in the region of the diaphragm 4. The electrical system 41, 42 consists of strain gages, which change their resistance when deformed under the action of force. Measuring bridges of this type are well known.

LIST OF REFERENCE NUMERALS OR CHARACTERS 1 housing
2 measuring surface
3 measuring surface
4 diaphragm
5 force conductor
6 bit
7 mount
8 fastener
9 terminals
11 cover 12 housing part
13 fastener
14 bit
15 force conductor
16 mount
17 indicator
20 housing interior
21 bearing surface
23 opening
24 opening
31 phototransmitter
32 photoreceiver
33 insert
34 covering disc
35 seal
36 covering disc

The invention claimed is:

1. A measuring device, comprising a housing having two opposing measuring surfaces, to each of which measuring surfaces there are assigned a phototransmitter and a photoreceiver disposed in an interior of said housing, each measuring surface having an opening which is transparent to light of at least one wavelength, wherein at least one of the two measuring surfaces is in the form of a dynamometer, and wherein on each measuring surface there is present a force conductor having a bearing surface.

2. A measuring device as defined in claim 1, wherein said measuring surface designed as a dynamometer exhibits a diaphragm capable of being deformed under the action of force.

3. A measuring device as defined in claim 2, wherein said measuring surface designed as a dynamometer is provided with at least one half bridge or full bridge forming part of an electrical system and adapted to change its resistance when said diaphragm is deformed under the action of force.

4. A measuring device as defined in claim 3, wherein two or three full bridges are provided on said diaphragm so that a multi-axial resolution of a direction of a force flow is possible.

5. A measuring device as defined in claim 1, wherein said measuring surface designed as a dynamometer exhibits a force transducer capable of changing its electrical characteristics when force is exerted thereon, wherein said force transducer is a piezoelectric force transducer.

6. A measuring device as defined in claim 1, wherein said bearing surface is located on an exchangeable mount.

7. A measuring device as defined in claim 1, wherein said bearing surface surrounds said opening that is transparent to light of at least one wavelength.

8. A measuring device as defined in claim 1, wherein said housing is at least two-membered and that one of the measuring surfaces is disposed at a bottom of a housing part forming an interior space and the other measuring surface is disposed on a cover adapted to close said interior space and that an electrical connection to an electrical circuit located in the interior of the housing is provided.

9. A measuring device as defined in claim 8, wherein said measuring surface disposed at the bottom of said housing part is in the form of a dynamometer.

10. A measuring device as defined in claim 8, wherein said electrical circuit cooperates with said phototransmitter and said photoreceiver.

11. A measuring device as defined in claim 1, wherein said phototransmitter and said photoreceiver associated with one measuring surface are disposed, together with said phototransmitter and said photoreceiver associated with the other measuring surface, in a common insert.

12. A measuring device as defined in claim 11, wherein said phototransmitter and said photoreceiver associated with one measuring surface are disposed in said insert one opposite the other in a crisscross arrangement relative to said phototransmitter and said photoreceiver associated with the other measuring surface.

13. A measuring device as defined in claim 11, wherein an optical axis of said phototransmitter and an optical axis of said photoreceiver are at an angle to each other and are oriented toward said opening.

14. A measuring device as defined in claim 11, wherein said insert is resiliently mounted in said housing with reference to the measuring surface designed as a dynamometer.

15. A measuring device as defined in claim 1, further comprising control means exhibiting a learning mode for optical measurement and a learning mode for force measurement.

16. A measuring device as defined in claim 15, wherein means of selection are provided for the learning mode.

17. A measuring device as defined in claim 15, wherein a signal device is provided to indicate an operating status.

18. A measuring device as defined in claim 15, wherein a current operating status is signaled.

19. A measuring device, comprising a housing having two opposing measuring surfaces, to each of which measuring surfaces there are assigned a phototransmitter and a photoreceiver disposed in an interior of said housing, each measuring surface having an opening which is transparent to light of at least one wavelength, wherein at least one of the two measuring surfaces is in the form of a dynamometer, and wherein on each measuring surface there is present a force conductor having a bearing surface located on an exchangeable mount.

20. A measuring device, comprising a housing having two opposing measuring surfaces, to each of which measuring surfaces there are assigned a phototransmitter and a photoreceiver disposed in an interior of said housing, each measuring surface having an opening which is transparent to light of at least one wavelength, wherein at least one of the two measuring surfaces is in the form of a dynamometer, and wherein on each measuring surface there is present a force conductor having a bearing surface that surrounds said opening that is transparent to light of at least one wavelength.

21. A measuring device, comprising a housing having two opposing measuring surfaces, to each of which measuring surfaces there are assigned a phototransmitter and a photoreceiver disposed in an interior of said housing, each measuring surface having an opening which is transparent to light of at least one wavelength, wherein at least one of the two measuring surfaces is in the form of a dynamometer, said measuring device further comprising control means exhibiting a learning mode for optical measurement and a learning mode for force measurement, wherein means of selection are provided for the learning mode.

* * * * *